United States Patent [19]

Fouchey

[11] Patent Number: 4,768,374
[45] Date of Patent: Sep. 6, 1988

[54] TORSION BAR ADJUSTMENT SYSTEM

[75] Inventor: John W. Fouchey, Sterling Heights, Mich.

[73] Assignee: Chrysler Motor Corporation, Highland Park, Mich.

[21] Appl. No.: 112,633

[22] Filed: Oct. 26, 1987

[51] Int. Cl.⁴ ............................................. G01M 19/00
[52] U.S. Cl. ........................................ 73/118.1; 73/669
[58] Field of Search .......................... 73/118.1, 12, 669

[56] References Cited

U.S. PATENT DOCUMENTS 4,263,809 4/1981 Petersen et al. ................ 73/118.1 X
4,517,832 5/1985 Holland et al. ..................... 73/118.1

Primary Examiner—Jerry W. Myracle
Attorney, Agent, or Firm—Wendell K. Fredericks

[57] ABSTRACT

Height of a front end of a motor vehicle equipped with torsion bars is measured and adjusted by a jouncing device that compensates for initial height loss of the front suspension system of new vehicles due to the setting of front end components.

4 Claims, 7 Drawing Sheets

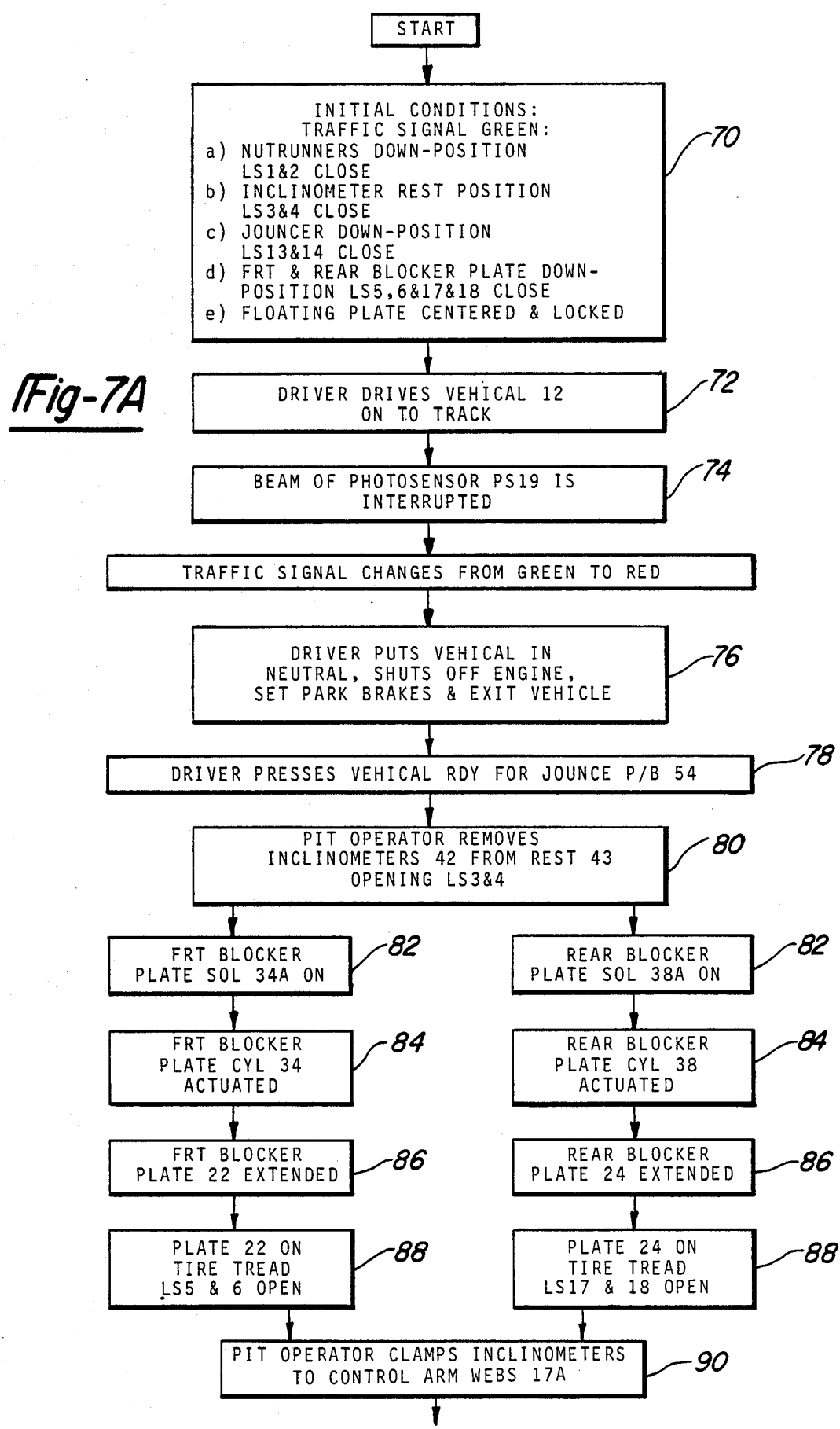

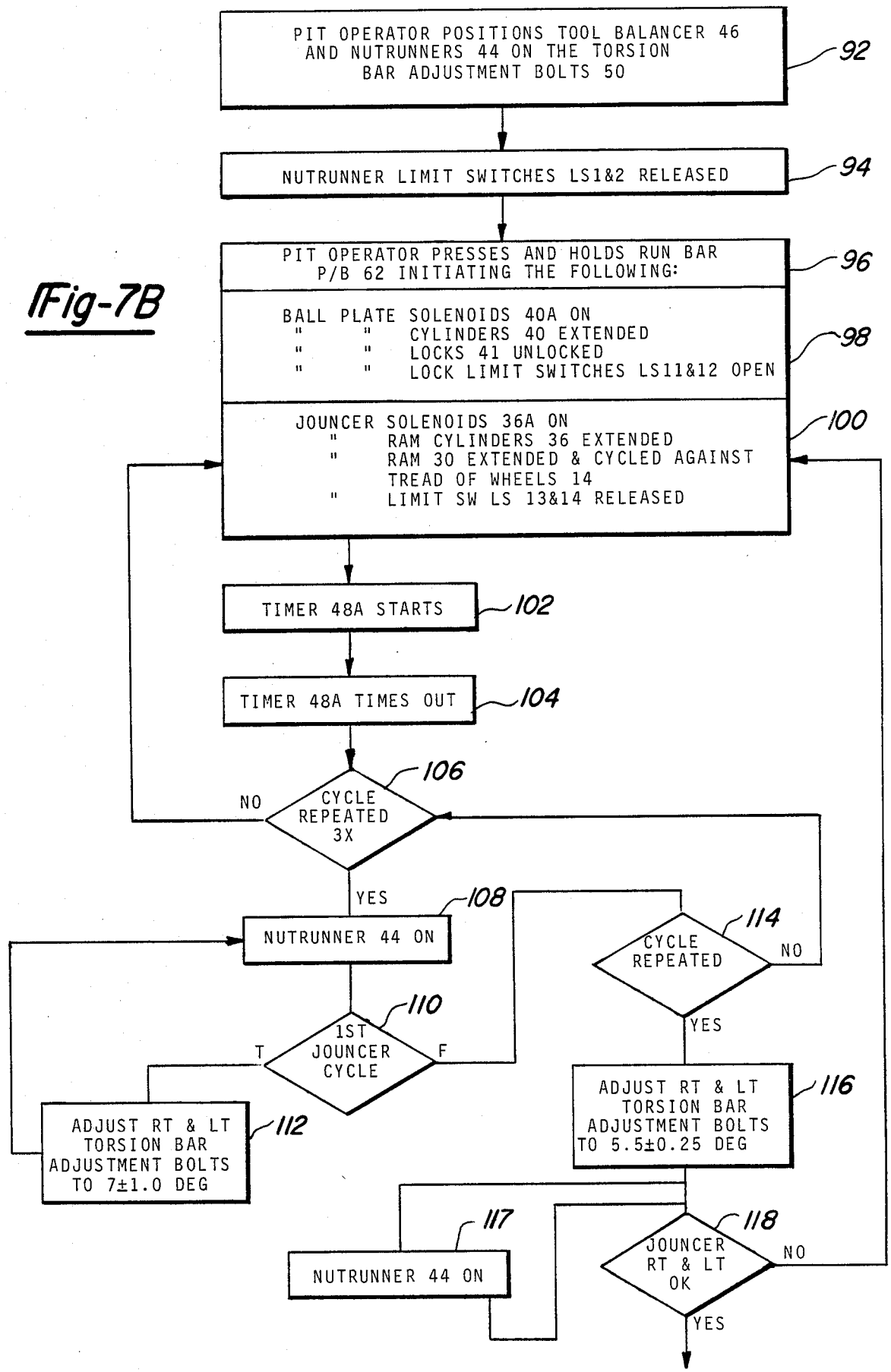

TORSION BAR ADJUSTMENT SYSTEM

BACKGROUND OF THE INVENTION

1. Field of the Invention

This invention relates to vehicle height adjustment and more particularly, in a preferred embodiment to apparatus and methods for automatic adjustment of front suspension height of new vehicles equipped with front-end torsion bars.

2. Description of the Prior Art

In prior art front suspension height adjustment schemes, means are employed to compensate for initial height loss of the front suspension system of new vehicles due to settling of the components. Typically, new vehicle suspension components will settle most during the first 2,000 miles of operation causing front height loss. To compensate for this initial front height loss, the automobile manufacturers usually have their assembly plant technicians set front suspension heights somewhat higher than the vehicle specifications prescribed.

Prior to setting the front end, the vehicle must be jounced or rebounded in an attempt to remove and eliminate the frictional effects of the front suspension components. Then after eliminating the frictional effects, the height of the vehicle is adjusted prior to making any of the other front suspension adjustments such as caster, camber, toe-in, etc.

With respect to vehicles equipped with torsion bars, under assembly line conditions, the most convenient manner for eliminating friction effects of the components, primarily the rubber grommets and bushings, has been to raise the vehicle slightly off the front wheels by contacting a frame member with a power lifting device and then removing the lift, allowing the wheels and front suspension to bounce. This rebounding approach does, sometimes eliminate some of the frictional effects but such an approach does not emulate the settling effects that would occur over 2,000 miles of vehicle operation.

Some automobile manufacturers prescribe manually jouncing each vehicle vigorously several times. They recommend that the front bumper be used and the front bumper amplitude (total vehicle movement during jouncing) be at least 4 inches, which may require the service of two people to achieve the result. Once the vehicles have been jounced or rebounded, manual adjustments of the height of the vehicle take place.

Such jouncing and rebounding techniques appear to achieve inconsistent amounts of correction of the front suspensions of the new vehicles on the assembly lines and the manual adjusting procedure of vehicle height is time consuming. A search for various other means to reduce frictional effects in new vehicle front ends and for more convenient and efficient means for adjusting vehicle height was initiated. This search resulted in the novel apparatus and method of the present invention.

BRIEF SUMMARY OF THE INVENTION

A method and apparatus for measuring and adjusting the height of the front end of a motor vehicle equipped with torsion bars so as to compensate for initial height loss of the front suspension system of new vehicles due to the settling of the components.

Jouncing devices are used to jounce the vehicle at the road contacting surfaces of the front wheels while inclinometers, that had been calibrated with respect to a chosen reference value, are attached to the web of the lower control arms of the front end suspension system. After a first jounce cycle, the lower control arms are set to a preliminary angular setting and then the vehicle is again jounced. After the second jounce cycle, the lower control arms are set to a final setting which regulates the height of the vehicle such that any further settling of the front-end components of the vehicle is minimized.

BRIEF DESCRIPTION OF THE DRAWING

FIGS. 7A, 7B and 7C are flow diagrams illustrative of the sequence of operation of the torsion bar adjustment system.

DETAILED DESCRIPTION

Figure 1:
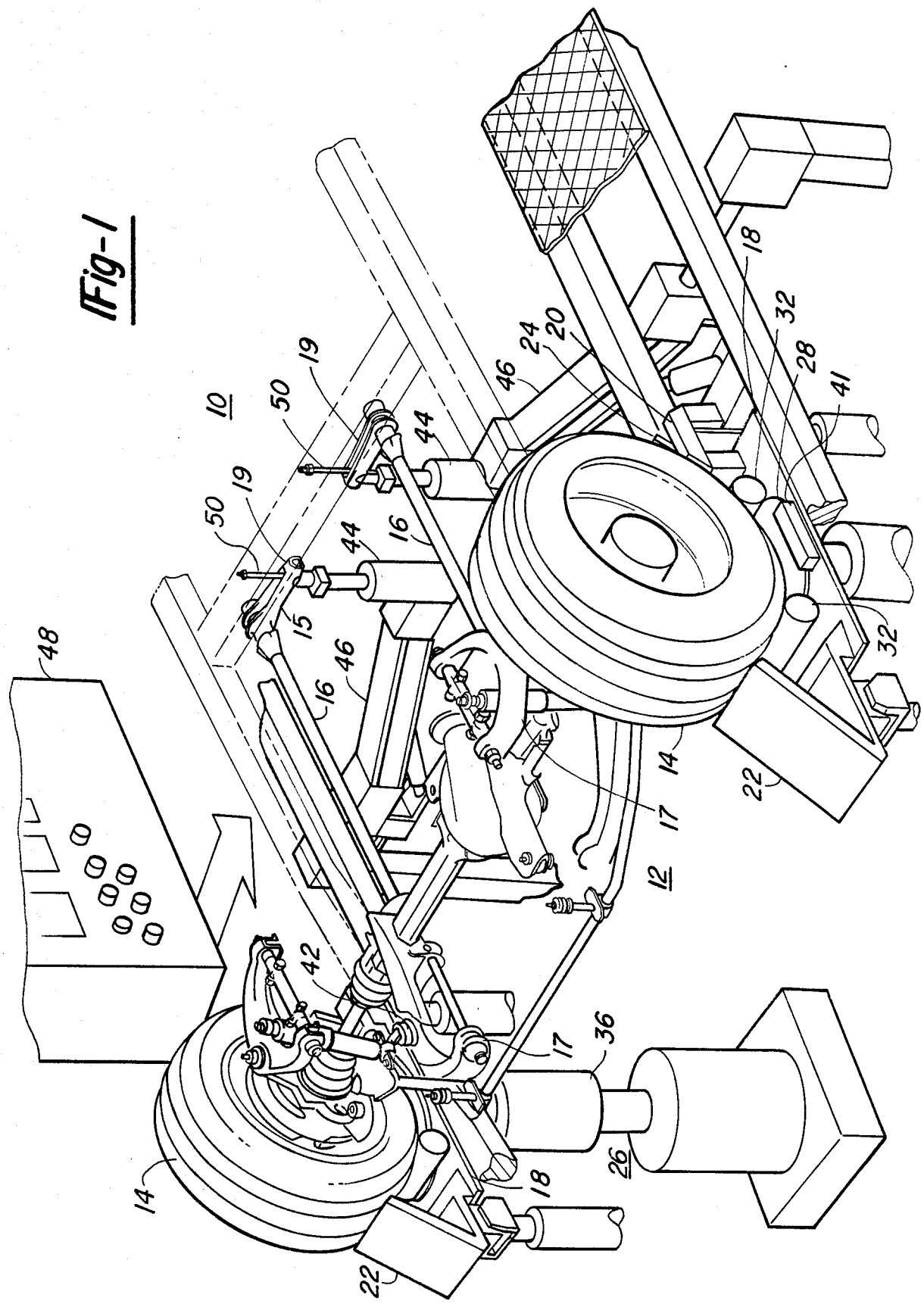
FIG. 1 is a perspective view of a preferred embodiment of the torsion bar adjustment system.

Referring to FIG. 1, there is shown a perspective view of an automatic vehicle height adjustment system 10 for determining and performing a correct height adjustment for a vehicle 12. System 10 includes means for jouncing the vehicle and for automatically adjusting the height of the front end.

Vehicle 12 is depicted with the underside exposed, and the front wheels 14 positioned on left and right tracks 18 of the automatic vehicle adjustment system 10. A front suspension of vehicle 12 includes a pair of adjustable torsion bars 16 mounted between a front lower control arm 17 and a rear anchor 15 which are used to maintain vehicle 12 at a specified height. Track 18 includes a left and right drive-on guides 20 for guiding the front wheels 14 of vehicle 12 into a proper position on track 18 for adjusting the front end. Vehicle 12, illustratively depicted as a part of the chassis of a Dodge Dakota truck is driven onto track 18 at floor level. A pair of power actuated, hinged manipulated, front blocker plates 22 and a pair of power actuated, hinged manipulated, rear blocker plates 24 on each track are activated to swing up against the front and rear surfaces of the front wheels 14 so as to block the wheels on tracks 18.

Figure 3:
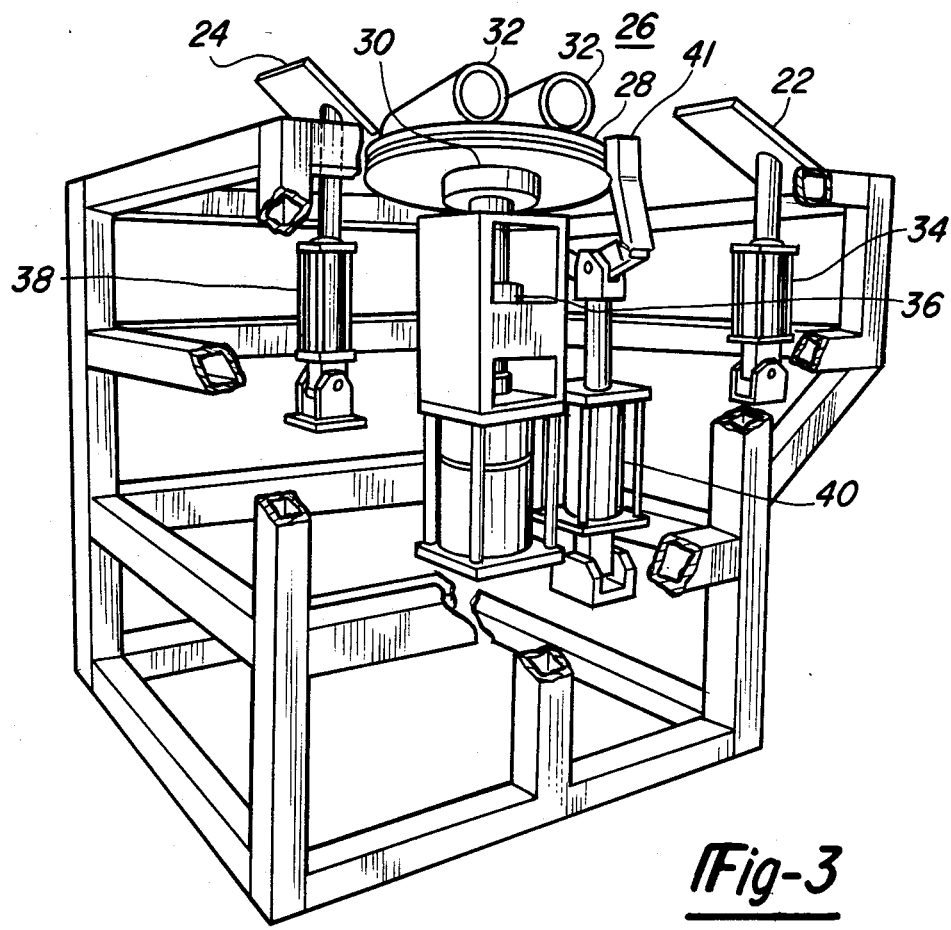
FIG. 3 is a perspective view of a jouncing device used in the torsion bar adjustment system of this invention.

Positioned on tracks 18 at a location to receive the road contacting surfaces of each front wheel 14 are a pair of jouncing devices 26 (best seen in FIG. 3). Each device 26 includes a ball mounted, floating plate 28, a power actuated jouncer ram 30 mounted to pass through a center aperture in plate 28 for upward-downward movement against the road contacting surfaces of the front wheels 14 and a pair of swivelly mounted rollers 32 positioned at a front and rear end of each ram 30 for centering the road contacting surface of the wheels 14 in alignment with the jouncer rams 30.

From below floor level, from a garage pit, and at each front wheel 14, there are four pneumatic air cylinders 34, 36, 38 and 40 used with each jouncing device 26. Cylinder 34 is used to raise and lower the front blocker plate 22. Cylinder 36 is used to cycle the jouncer ram 30 upward and downward in order to jounce the wheels of vehicle 12 at the road contacting surfaces simulating the reactions the front end experiences during normal road operations. Cylinder 38 is used to raise and lower the rear blocker plates 24. Cylinder 40 is used to actuate a plate lock 41 which is used to lock plate 28 in place while vehicle 12 is positioned on track 18 and to unlock plate 28 to allow wheels 14 to move through lateral "scuff" when wheels 14 are dropped onto rollers 32 during a jouncing operation. Each of these cylinders are under operator control.

Figure 4:
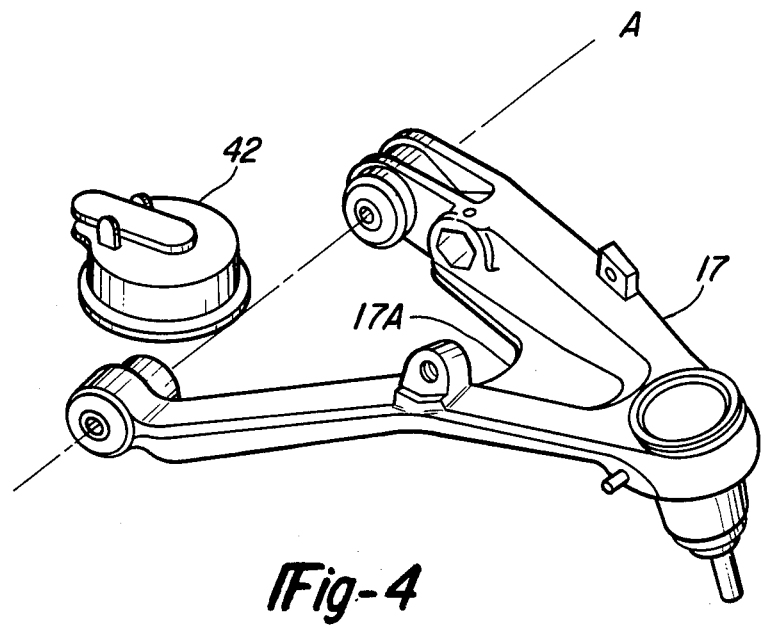
FIG. 4 is a perspective view of a lower control arm of a vehicle depicted to show the relationship of the web portion of the control arm to which the inclinometer is clamped for measuring the angular position of the arm about a pivotal axis A.

Referring to FIG. 4, an inclinometer 42 is clamped to a web section 17a of each front lower control arm 17 for measuring changes in height of vehicle 12 caused by arm 17 being repositioned about an axis "A". Electrical signals from the inclinometers 42, indicative of a positive or negative angle setting of the front lower control arms 17 with respect to a chosen reference, are routed to a control unit 48. A switch activating rest 43 for storing the inclinometers (best seen in FIG. 2) is mounted on a wall in the pit. Each rest includes a limit switch to indicate the presence or absence of the inclinometer. This feature is provided to prevent leaving the inclinometer accidentally clamped to the web Section 17A of the lower control arm 17 when vehicle 12 is driven off tracks 18. Also, the rest 43 must be adjusted to the chosen reference position of zero (0) degrees so that when the inclinometers 42 are clamped to rest 43, the reference position can be used to confirm the calibration of the right and left inclinometers 42.

Also illustrated in FIG. 1, a pair of electrically controlled nutrunners 44 each of which is mounted on a pneumatic-air cylinder, controlled tool balancer 46 are disposed near the rear anchor 19 of each torsion bar 16 and are used for adjusting a torsion bar adjustment bolt 50. Each nutrunner 44 responds separately to the related right or left inclinometer 42 lower control arm angular position signals to effect independent control of the adjustments of the right and left torsion bars. The necessary control signals are issued from a processor control unit 48 and routed to each nutrunner to effect start, stop, right or left rotation of as well as latching to or unlatching from the torsion bar adjustment bolts 50.

Each tool balancer 46 is capable of absorbing torque generated by the nutrunner 44 and is able to follow the angle changes of the torsion bar adjustment bolt 50 as adjustments are performed. Also, control signals are provided to the tool balancer 46 for holding or latching nutrunner 44 in place during jouncing cycles and for unlatching and moving the nutrunners out of the way when vehicle 12 is driven off and on tracks 18.

Figure 2:
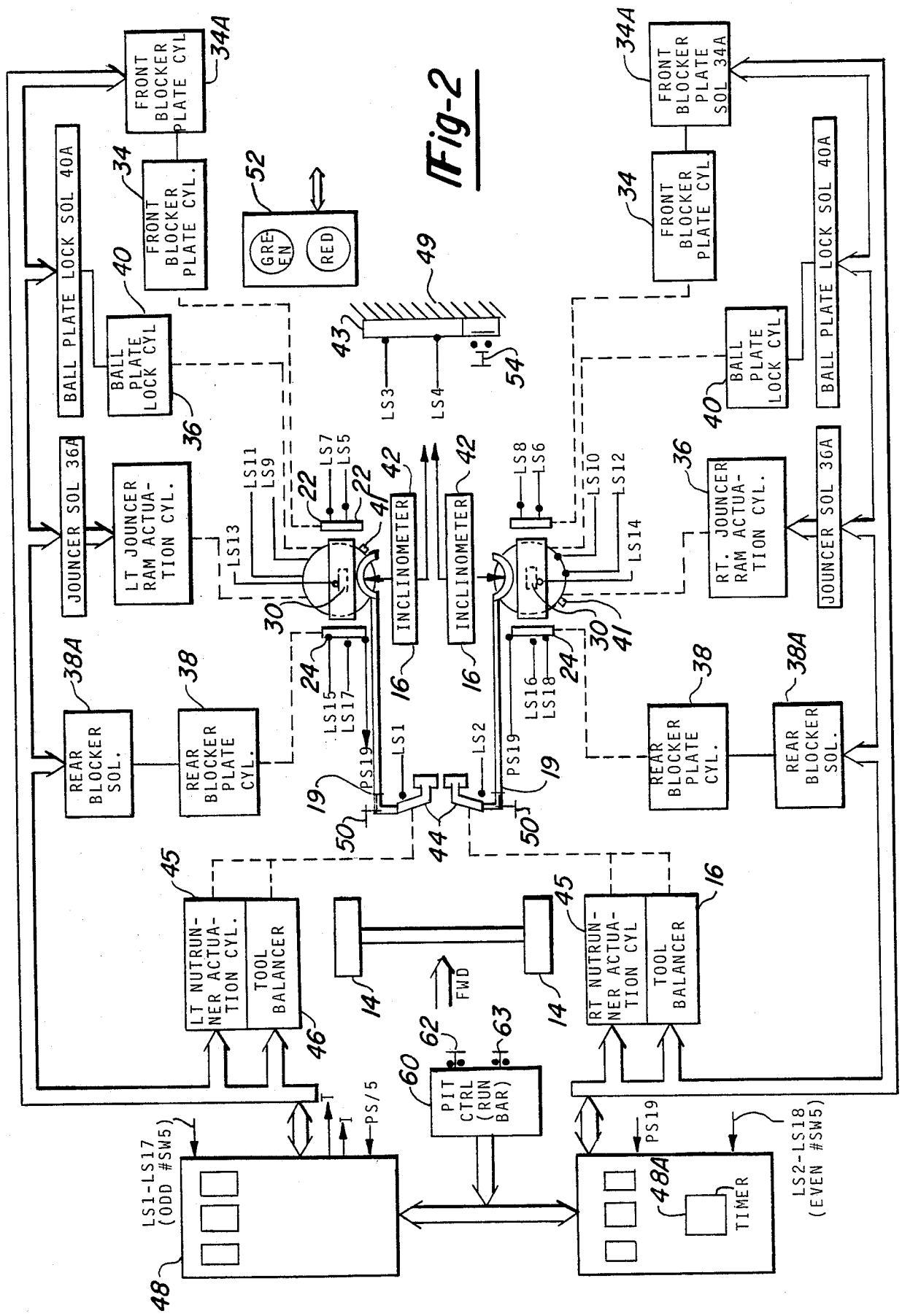
FIG. 2 is a block diagram of the torsion bar adjustment system.

Referring now to FIG. 2, there is shown in block diagram form, the automatic vehicle height adjustment system 10. Vehicle 12 is depicted parked on tracks 18 in front of a traffic signal unit 52 that is part of system 10. Before vehicle 12 is driven upon track 18, the traffic signal unit 52 is lit GREEN. Traffic signal unit 52 is lit GREEN at this time only if the following conditions are met: (A) both tool balancers 46 are moved to lower both nutrunners 44 against a pair of down limit switches LS1 and LS2 closing them which provide signals to the control unit 48 indicating the nutrunners 44 are not in the path of vehicle 12, (B) both inclinometers 42 are stored in rest 43 closing a pair of limit switches LS3 and LS4 used to provide signals to the control unit 48 for notifying the operators the whereabouts of the inclinometers 42 and to prevent driving vehicle 12 off tracks 18 with the inclinometers 42 attached to webs 17a of the lower control arms 17, (C) the left and right jouncer rams 30 are fully retracted by jouncer ram cylinders 36 against the down-position limit switches LS13 and 14 closing them, and (D) the front and rear hinged blocker plates 22 and 24 are retracted by cylinders 34 and 38 respectively against and closing front plate down-position switches LS5 and 6 and rear plate down-position switches LS17 and 18.

Also, before driving vehicle 12 onto tracks 18, the driver should be assured that vehicle 12 has the recommended tire pressures, a full tank of fuel, no passenger or luggage compartment load and that tracks 18 are level.

As the front wheels 14 of vehicle 12 are driven pass the drive-on guides 20 into position on tracks 18, vehicle 12 breaks the light path of a pair photosensors PS19 which cause the traffic light unit 52 to change from GREEN to RED. When vehicle 12 is properly positioned so that the front wheels 14 are over jouncer rams 30 and straddling both pairs of swivelly mounted rollers 32, the driver puts the transmission in "NEUTRAL", turns off the engine, sets the "PARK" brake, exit the vehicle and then presses a "READY FOR JOUNCE" pushbutton 54 mounted on mounting bracket 49 at floor level which lights a corresponding panel lamps (not delineated) on control unit 48 and on a pit control panel 60.

When the "READY FOR JOUNCE" panel lamp lights on pit control panel 60, the pit operator, in response to the indication, removes the inclinometers 42 from the rest 43 opening inclinometer limit switches LS3 and 4. Upon removal of the inclinometers 42, a signal from the control unit 48 energizes two solenoids namely the front and rear blocker plates lock solenoids 34A and 38A respectively. These solenoids in turn cause the front and rear blocker plate cylinders 34 and 38 respectively to extend. The front and rear blocker plates 22 and 24 are raised from the down position to respective front and rear portions of the treads of wheels 14. The raising of the plates opens the respective limit switches LS5 and 6. The pit operator then clamps the right and left inclinometers 42 to their respective right and left lower control arms 17 of vehicle 12.

Figure 5:
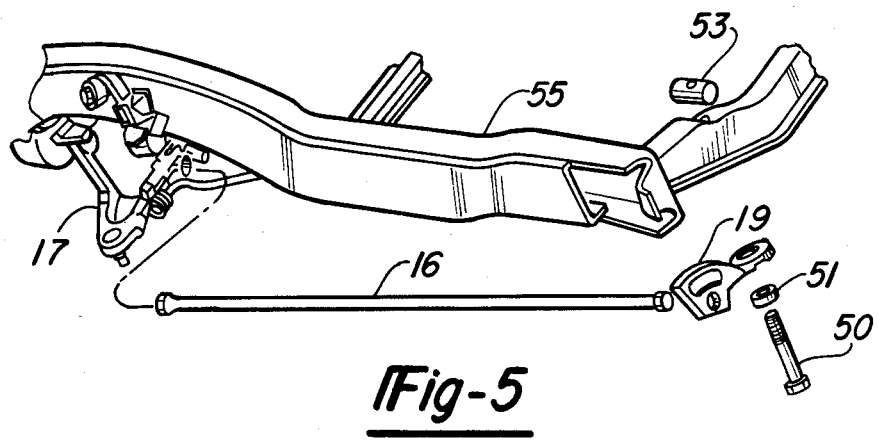
FIG. 5 is a perspective view illustrative of the connections a torsion bar with the lower control arm and a frame crossmember.

Then the pit operator manually locates the left and right tool balancers 46, and left and right nutrunners 44 in position for adjusting the torsion bar adjustment bolts 50 releasing or opening nutrunner limit switches LS1 and 2. Both the left and right torsion bars 16 are used for adjusting the height of vehicle 12. One end of each torsion bar is fastened to the lower control arm 17 while the other end is mounted in a slot of the anchor 19. As shown in FIG. 5, a bearing 51, the adjusting bolt 50 and a swivel unit 53 are used to connect anchor 19 to a frame cross members 55. Front suspension height is set by rotating the rear torsion bar anchors 19 by use of the adjustment bolt which in turn rotates the lower torsion arm about axis-A of FIG. 4 raising or lowering vehicle 12 as required.

Figure 6:
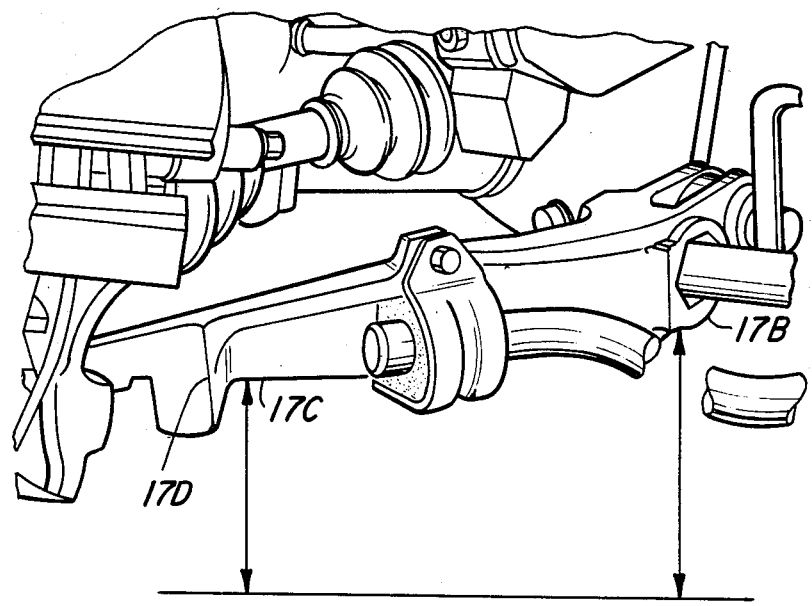
FIG. 6 is a perspective view illustrative of the points along the lower control arm used to establish an inner and outer measurement of height with respect to a floor surface.

As shown in FIG. 6 the front suspension height is normally specified as the difference in height of the lower control arm inner pivot 17b and the outer end of the arm 17c. Illustratively, a correct lower control arm differential height is normally expressed as 1.25 inches and is measured as follows: the inner pivot measurements are made from the bottom of the lower control arm rear pivot casting 17c midway between the webs 17a, to the floor surface while the outer end measurements are made from the bottom of the lower control arm rear edge of the casting just inboard of the steering stop 17d to the floor surface.

In this invention, by using the inclinometers, the height of the vehicle is measured with respect to the angle the lower control arm makes with respect to a reference angle that is parallel with a level ground surface. Also, refinement of the measurements are achieved by the repeated measurements of the angles.

After the left and right nutrunners 44 are positioned to turn adjustment bolts 50, the pit operator presses and holds the RUN BAR push buttons 62 to initiate the following automatic sequence: (A) the ball mounted plates 28 are unlocked. A signal from the control unit 48 energizes the ball plate lock solenoids 40A which in turn cause the right and left ball plate lock cylinders 40 to extend driving the right and left ball plate locks 41 to an unlock position which releases the respective plate lock limit switches LS11 and 12. And (B) The right and left jouncing devices 26 are activated to initiate jouncing of vehicle 12 three times at the right and left front wheels 14. The control unit 48 sends a signal to the jouncer solenoids 36A which in turn causes the pair of jouncer ram cylinders 36 of FIG. 3 to extend the jouncer rams 30 against the bottom surface of the front wheels 14 and to lift the front wheels and front end up to a chosen height above the track. When ram 30 is extended, limit switches LS13 and 14 are released causing a jouncer starting timer (not shown) in the control unit 48 to start operating. When the timer times out, the jouncer ram cylinders 36 are retracted causing limit switches 13LS and 14LS to closed signaling the end of one jounce cycle. The starting timer in the control unit 48 causes the above jounce cycle to be repeated two additional times.

The stroke of the jouncer ram cylinder 36 can be adjusted to insure that the front wheels 14 are lifted off the plates 28, illustratively, three inches. The right and left jouncer ram cylinders 36 can be programmed to alternately or simultaneously lift the front wheels; preferably the front wheels are jounced simultaneously.

When the jouncer rams 30 are retracted, the front wheels 14 are dropped onto the rollers 32 on plate 28 and because the plates 28 are unlocked, the wheels move through lateral scuff.

After the first three cycles of jouncing the front wheels 14, the inclinometers 42 provide to the control unit 48, an angle indication of the position of the web 17A of the lower control arms 17 with respect to the floor surface. Control unit 48 calculates and then automatically feeds the nutrunner actuation cylinders 45 so as to cause the nutrunners 44 to turn on and adjust the torsion bar adjustment bolts 50 to preliminary right and left limits of, illustratively of 7 plus or minus one degrees.

With the nutrunners 44 on the bolts 50, but in an unlatch condition, and upon completion of the second series of three jounces of the front wheels 14, the inclinometer readings are used to provide signals to the control unit 48 for turning on the nutrunners 44 in order to adjust the torsion bar adjustment bolts 50 to a final setting of 5.5 plus or minus 0.25 degrees.

If the ACCEPT LEFT and ACCEPT RIGHT lights illuminate on the control unit 48, then the height adjustments are complete. If not, the jounce and adjustment procedure has to be repeated.

After the adjustment, the pit operator removes the inclinometer 42 from the lower control arms 17 and replaces them in the rest 43.

The tool balancer 46 and nutrunners 44 are returned to the "home position" causing the down position limit switches LS1 and 2 to close. The pit operator then presses a "CYCLE COMPLETE" pushbutton 63 to cause the front and rear blocker plates 22 and 24 respectively to retract, the plate lock 41 to lock plate 28 and the traffic signal 52 to light GREEN. The driver then drive vehicle 12 from tracks 18.

Figure 7C:
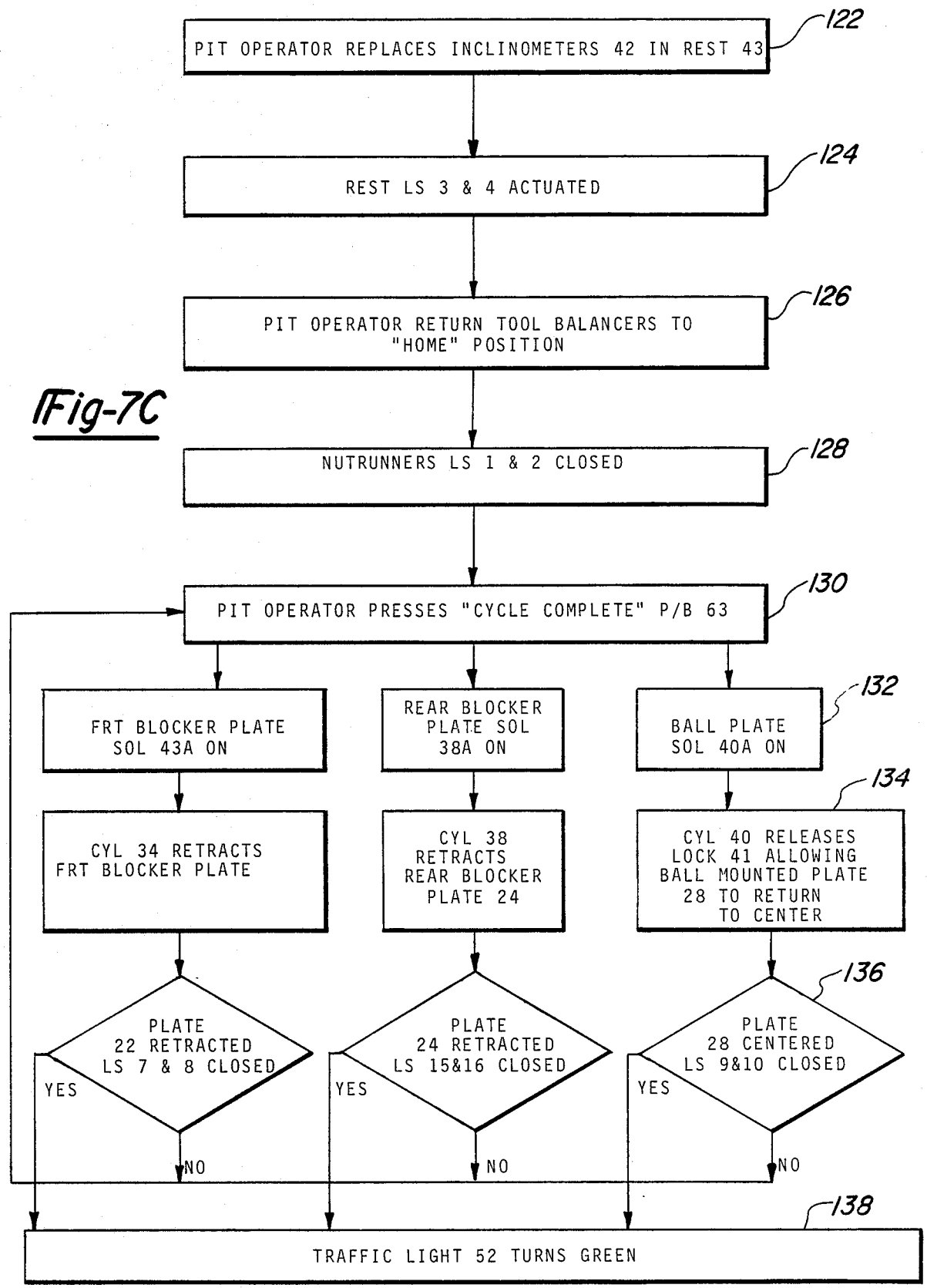

With reference now to FIG. 7, the sequence of operation of the system is summarized in flowchart form. The flowchart is described in connection with FIGS. 1,2,3, and 4. Starting with the first block 70 the initial conditions of system 10 are established. In block 72, the vehicle in which the front-end height is to be adjusted is driven onto the tracks 18. As the vehicle is driven onto the tracks, the beam of photosensor PS19 is interrupted as indicated in block 74 which causes the traffic signal unit of system 10 to change from a GREEN light to a RED light as indicated in block 75. Blocks 76 and 78 indicates the procedure for getting the vehicle ready for jouncing. Blocks 82 through 88 indicate the automatic operation that takes place when the pit operator, as indicated in block 80, removes the inclinometer from the rest 43. Blocks 90 and 92 describe the placement of the inclinometers and nutrunners in position for the jouncing operation while block 94 indicates the reaction of the limit switches associated with nutrunners.

In block 96, the jouncing operation is initiated. Block 98 describes the unlocking of the ball plates that allow for the lateral scuff of the front wheels during jouncing. Blocks 100 through 106 describes the jouncing cycle that is repeated three times. As in blocks 108 through 112, the preliminary adjustment of the vehicle height is performed. Then, as in decsion block 114, another jouncing cycle is performed in order to adjust the vehicle height to a final setting as indicated in blocks 116 and 117. This jouncing procedure is repeated, as indicated in decision block 118, if the prior jouncing operation doesn't bring the height of the vehicle within limits. As indicated in blocks 122 through 138, the system is prepared for shutdown after the height of the vehicle is properly set and the vehicle is removed from the tracks.

Although the present invention has been described with reference to a preferred embodiment, numerous modifications and rearrangements can be made, and come within the scope of the invention.

I claim:

1. A method of measuring and adjusting, in a torsion bar adjustment system; a suspension height of a left and right lower control arm of a left front wheel and a right front wheel associated with a steerable front axle of a motor vehicle, said motor vehicle being equipped with a left and a right front-end torsion bar, said system being the type wherein said adjustment system includes a pair of tracks at floor level with respect to the road contacting surfaces of the left and right front wheels, said pair of tracks including a left and a right drive-on guide for guiding the wheels into a chosen position on the tracks, wherein said right front-end torsion bar of said right front wheel is disposed between the right lower control arm that is connected to a right end of the front axle of the vehicle and a right adjustable anchor connected to a right end of a frame crossmember, wherein said left front-end torsion bar of said left front wheel is disposed between the left lower control arm connected to a left end of the front axle of the vehicle and a left adjustable anchor connected to a left end of the frame crossmember, said frame crossmember being disposed a chosen distance from the left and right lower control arms, which method comprises:

a. disposing a left jouncing device in the left track and a right jouncing device in the right track of the torsion bar adjustment system at a location along the tracks for vertically jouncing a front end of the vehicle, said jouncing devices including a ball mounted, floating plate, a power actuated jouncer ram mounted so as to pass through a center aperture of the floating plate for upward-downward movement against a road contacting surface of the front wheels, and a pair of swivelly mounted rollers positioned at a front and a rear end of each ram for centering the road contacting surface of the wheels in alignment with the jouncer rams;

b. centering the ball mounted floating plate on the right and left tracks of the torsion bar adjustment system;

c. locking the floating plates in the centered position on the right and left tracks;

d. positioning said left and right front wheels of said vehicle such that a road contacting surface of said left front wheel is parallel with a road contacting surface of said right front wheel on the locked ball mounted floating plates of the left and right tracks of said torsion bar adjustment system and the wheels are free to rotate;

e. blocking the left and right front wheels in position on the locked, ball mounted, floating plates of the left and right tracks of the torsion bar adjustment system;

f. mounting a left-side inclinometer to a web of the left lower control arm and a right-side inclinometer to a web of the right lower control arm for measuring the angular position of the control arms with respect to a reference angle as the vehicle is jounced on the tracks;

g. positioning a left and a right electrically controlled nutrunner in an unlatched condition to a torsion bar adjustment bolt of the left and right torsion bars;

h. unlocking the floating plates of each track;

i. activating the jouncer rams a chosen number of times so as to adjust the vehicle height near a preliminary level;

j. after latching the left and right nutrunners to the adjustment bolts, tightening the adjustment bolts in response to signals from said inclinometers indicative of the angular positions of the lower control arms so as to adjust the vehicle height at the preliminary level;

k. after unlatching the left and right nutrunners, activating the jouncer rams again a suitable number of times so as to bring the vehicle height near a chosen final level;

l. after again latching the left and right nutrunners to the adjustment bolts, tightening the adjustment bolts in response to signals from said inclinometers indicative of the angular position of the lower control arms so as to bring the vehicle height to the final level;

m. locking the floating plates of the jouncing devices in a centered position;

n. removing the left and right inclinometers from the webs of the lower control arms;

o. providing an indication of the removal of the inclinometers so as to prevent removing the front wheels of the vehicle off the track before such a removal; and p. unblocking the front wheels of the vehicle from movement along the tracks.

2. A torsion bar adjustment system for measuring and adjusting a suspension height of a left and right lower control arm of a left front wheel and a right front wheel associated with a steerable front axle of a motor vehicle, said motor vehicle being equipped with a left and a right front-end torsion bar, said system being the type wherein said adjustment system includes a pair of tracks at floor level with respect to the road contacting surfaces of the left and right front wheels, said pair of tracks including a left and a right drive-on guide for guiding the wheels into a chosen position on the tracks, wherein said right front-end torsion bar of said right front wheel is disposed between the right lower control arm that is connected to a right end of the front axle of the vehicle and a right adjustable anchor connected to a right end of a frame crossmember, wherein said left front-end torsion bar of said left front wheel is disposed between the left lower control arm connected to a left end of the front axle of the vehicle and a left adjustable anchor connected to a left end of the frame crossmember, said frame crossmember being disposed a chosen distance from the left and right lower control arms, which system comprises:

a. means for disposing a left jouncing device in the left track and a right jouncing device in the right track of the torsion bar adjustment system at a location along the tracks for vertically jouncing a front end of the vehicle, said jouncing devices including a ball mounted, floating plate, a power actuated jouncer ram mounted so as to pass through a center aperture of the floating plate for upward-downward movement against a road contacting surface of the front wheels, and a pair of swivelly mounted rollers positioned at a front and a rear end of each ram for centering the road contacting surface of the wheels in alignment with the jouncer rams;

b. means for centering the ball mounted floating plate on the right and left tracks of the torsion bar adjustment system;

c. means for locking the floating plates in the centered position on the right and left tracks;

d. means for positioning said left and right front wheels of said vehicle such that a road contacting surface of said left front wheel is parallel with a road contacting surface of said right front wheel on the locked ball mounted floating plates of the left and right tracks of said torsion bar adjustment system and the wheels are free to rotate;

e. means for blocking the left and right front wheels in position on the locked, ball mounted, floating plates of the left and right tracks of the torsion bar adjustment system;

f. means for mounting a left-side inclinometer to a web of the left lower control arm and a right-side inclinometer to a web of the right lower control arm for measuring the angular position of the lower control arms with respect to a reference angle as the vehicle is jounced on the tracks;

g. means for positioning a left and a right electrically controlled nutrunner in an unlatched condition to a torsion bar adjustment bolt of the left and right torsion bars;
h. means for unlocking the floating plates of each track;
i. means for activating the jouncer rams a chosen number of times so as to adjust the vehicle height near a preliminary level;
j. means for tightening the adjustment bolts in response to signals from said inclinometers indicative of the angular positions of the lower control arms so as to adjust the vehicle height at the preliminary level after latching the left and right nutrunners to the adjustment bolts;
k. means for activating the jouncer rams again a suitable number of times so as to bring the vehicle height near a chosen final level after unlatching the left and right nutrunners;
l. means for tightening the adjustment bolts in response to signals from said inclinometers indicative of the angular position of the lower control arms so as to bring the vehicle height to the final level after again latching the left and right nutrunners to the adjustment bolts;
m. means for locking the floating plates of the jouncing devices in a centered position;
n. means for removing the left and right inclinometers from the webs of the lower control arms;
o. means for providing an indication of the removal of the inclinometers so as to prevent removing the front wheels of the vehicle off the track before such a removal; and
p. means for unblocking the front wheels of the vehicle from movement along the tracks.

3. Apparatus in accordance with claim 2 wherein the preliminary level of adjustment of the lower control arm is a setting below the desired final setting.

4. Apparatus in accordance with claim 3 wherein the difference between the preliminary setting of the lower control arm and the final setting is about two degrees.

* * * * *